(12) United States Patent
Adamik et al.

(10) Patent No.: US 9,322,733 B2
(45) Date of Patent: Apr. 26, 2016

(54) DUCT PORT FOR PRESSURE SENSING

(75) Inventors: Petr Adamik, Jihlava (CZ); Steve Wolff, Hamel, MN (US); Reed Bisson, Minnetonka, MN (US); Amy Ragland, Brooklyn Center, MN (US)

(73) Assignee: Honeywell International Inc., Morris Plains, NJ (US)

( * ) Notice: Subject to any disclaimer, the term of this patent is extended or adjusted under 35 U.S.C. 154(b) by 438 days.

(21) Appl. No.: 13/190,188

(22) Filed: Jul. 25, 2011

(65) Prior Publication Data

US 2013/0025729 A1  Jan. 31, 2013

(51) Int. Cl.
*F16L 41/00* (2006.01)
*G01L 19/00* (2006.01)

(52) U.S. Cl.
CPC ..................... *G01L 19/003* (2013.01)

(58) Field of Classification Search
USPC ............... 285/201, 202, 203, 204, 208, 209, 285/139.1, 139.2, 139.3, 140.1, 136.1; 411/508
See application file for complete search history.

(56) References Cited

U.S. PATENT DOCUMENTS

| | | | |
|---|---|---|---|
| 4,285,225 A | | 8/1981 | Snell |
| 4,981,310 A | * | 1/1991 | Belisaire ..................... 285/140.1 |
| 5,068,957 A | | 12/1991 | Felson |
| 5,314,212 A | | 5/1994 | Sanders |
| 5,437,087 A | | 8/1995 | Gordon |
| 5,564,756 A | | 10/1996 | Hamilton |
| 6,113,006 A | * | 9/2000 | Walker ...................... B60S 1/52 239/284.1 |
| 6,382,305 B1 | | 5/2002 | Sano |
| 6,422,796 B1 | | 7/2002 | Tomaini |
| 6,450,043 B1 | | 9/2002 | Kolkebeck et al. |
| 6,623,045 B2 | | 9/2003 | Wurgler |
| 7,044,537 B2 | | 5/2006 | Schoemann et al. |
| 7,144,212 B2 | | 12/2006 | Kaye et al. |
| 7,320,569 B2 | | 1/2008 | Kaye et al. |
| 7,717,476 B2 | * | 5/2010 | Shida et al. .................... 285/203 |
| 2004/0135367 A1 | | 7/2004 | Otsuga et al. |
| 2005/0000153 A1 | | 1/2005 | White et al. |
| 2005/0260060 A1 | * | 11/2005 | Zoubek ................. F16B 21/086 411/508 |
| 2006/0226662 A1 | | 10/2006 | Capone et al. |
| 2009/0022564 A1 | | 1/2009 | Summerfield |
| 2010/0067975 A1 | | 3/2010 | Brown et al. |
| 2010/0087134 A1 | | 4/2010 | Major et al. |
| 2010/0170152 A1 | | 7/2010 | Perkins |

FOREIGN PATENT DOCUMENTS

| | | |
|---|---|---|
| EP | 0539139 | 4/1993 |
| JP | 60003433 | 1/1985 |
| JP | 8282254 | 10/1996 |

* cited by examiner

*Primary Examiner* — Aaron Dunwoody
(74) *Attorney, Agent, or Firm* — Seager, Tufte & Wickhem, LLP

(57) ABSTRACT

Ports for sensing one or more parameters in an HVAC system and methods for installing such ports. In one illustrative embodiment, a port provides a fluid passageway through a wall of an HVAC component such as an air duct. The port may be formed of a hollow stem member having a first end and a second end and a head member positioned therebetween. The port may include an anchor member for anchoring the port to a wall of the HVAC component. In some cases, the anchor member may secure the port within the wall such that the head member forms a substantially fluid tight seal with the wall.

18 Claims, 6 Drawing Sheets

DUCT PORT FOR PRESSURE SENSING

TECHNICAL FIELD

The disclosure is generally relates to HVAC systems, and more particularly, to a duct port capable of being installed through a wall of differing materials.

BACKGROUND

Heating, ventilation, and/or air conditioning (HVAC) systems are often used to control the comfort level within a building or other structure. Such HVAC systems typically include an HVAC controller that controls various HVAC components of the HVAC system in order to affect and/or control one or more environmental conditions within the building.

In some cases, it may be desirable to install one or more ports within an HVAC system in order to measure, for example, an air pressure or air pressure drop within the HVAC system. For instance, many forced air HVAC systems include an air filter to help remove dust and other pollutants from within the building and to protect the HVAC equipment from dust buildup which may negatively impact system performance. The air filter will become dirty over time, and as part of regular maintenance, the air filter should be changed. Continuing to run an HVAC system with an excessively dirty filter can reduce the efficiency of the HVAC system, and in some cases, can cause damage and/or reduce the expected lifetime of some of the HVAC components. In order to help prevent the undesirable side effects of running an HVAC system with an excessively dirty filter, it may be desirable for an HVAC system to alert a user when an air filter needs to be changed. The buildup of dust in the air filter may be correlated to an air pressure or air pressure drop within the system. In this example, it may be desirable to utilize pressure sensors within the HVAC system to monitor the quality of the air filter. This is just one example of when it may be desirable to install one or more ports, at selected locations, within an HVAC system.

SUMMARY

The present disclosure related generally to ports for sensing one or more parameters in an HVAC system, and methods for installing such ports. In one illustrative embodiment, a port provides a fluid passageway through a wall of an HVAC component such as an air duct. The port may be formed of a hollow stem member having a first end and a second end. A head member may be positioned between the first and second end of the hollow stem member and may extend laterally therefrom. The port may further include two or more ribs extending longitudinally along the hollow stem member. The ribs may be situated between the head member and the second end of the stem member and may extend laterally away from the stem member. The ribs may be structured such that a height of the ribs increases towards the head member. The port may also include one or more flexible latch members extending longitudinally along the hollow stem member. The latch members may be situated between the head member and the second end of the hollow stem member. A first end of the one or more latch members may be secured to the hollow stem member while a second end may be generally free. The latch members may extend laterally away from the hollow stem member by a height. The latch members may be structured such that the height of the one or more flexible latch members increases towards the head member. This is just one illustrative embodiment.

The preceding summary is provided to facilitate an understanding of some of the innovative features unique to the present disclosure, and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following detailed description of various embodiments in connection with the accompanying drawings, in which.

Figure 1:
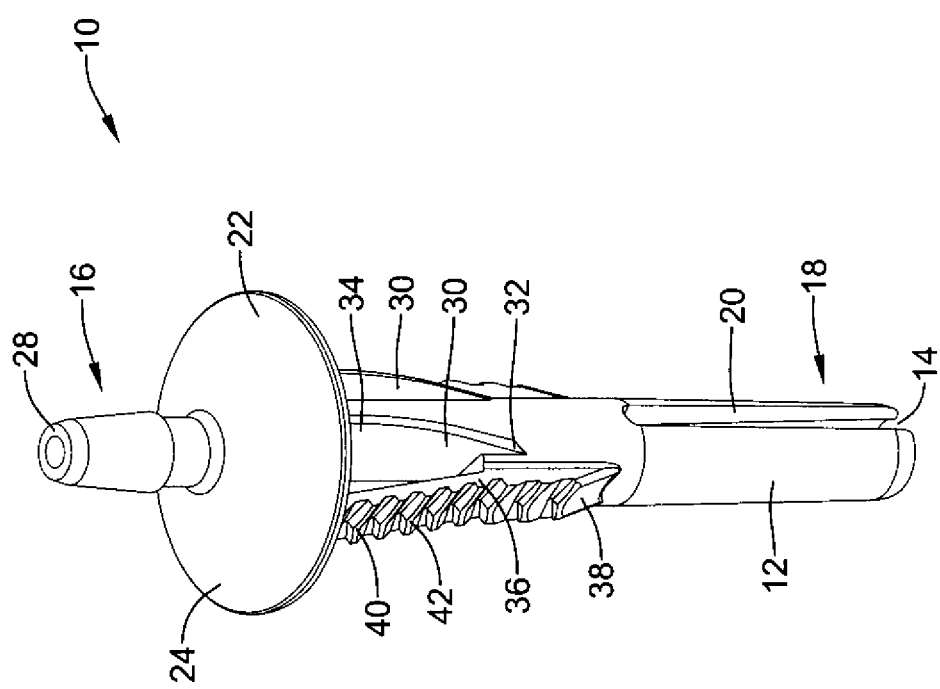
FIG. 1 is perspective view of an illustrative duct port.

While the disclosure is amenable to various modifications and alternative forms, specifics thereof have been shown by way of example in the drawings and will be described in detail. It should be understood, however, that the intention is not to limit aspects of the disclosure to the particular embodiments described. On the contrary, the intention is to cover all modifications, equivalents, and alternatives falling within the spirit and scope of the disclosure.

DESCRIPTION

For the following defined terms, these definitions shall be applied, unless a different definition is given in the claims or elsewhere in this specification.

All numeric values are herein assumed to be modified by the term "about", whether or not explicitly indicated. The term "about" generally refers to a range of numbers that one of skill in the art would consider equivalent to the recited value (i.e., having the same function or result). In many instances, the term "about" may be indicative as including numbers that are rounded to the nearest significant figure.

The recitation of numerical ranges by endpoints includes all numbers within that range (e.g., 1 to 5 includes 1, 1.5, 2, 2.75, 3, 3.80, 4, and 5).

Although some suitable dimensions ranges and/or values pertaining to various components, features and/or specifications are disclosed, one of skill in the art, incited by the present disclosure, would understand desired dimensions, ranges and/or values may deviate from those expressly disclosed.

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The following description should be read with reference to the drawings in which similar elements in different drawings are numbered the same. The description and the drawings, which are not necessarily to scale, depict illustrative embodiments and are not intended to limit the scope of the disclosure. The illustrative embodiments depicted are intended only as exemplary. Selected features of any illustrative embodiment may be incorporated into an additional embodiment unless clearly stated to the contrary.

In many instances, a heating, ventilation, and air conditioning (HVAC) system may include one or more air filters to remove dust and other pollutants from the air inside a building or other structure. The air filter(s) may be installed in the return air duct to filter the air prior to the air entering the HVAC component, but it is contemplated that any other suitable location for the air filter(s) may be used. The presence of the air filter(s) may not only improve the indoor air quality, but may also may protect the HVAC components from dust and other particulate matter that might otherwise be permitted to enter the HVAC component.

In some cases, an HVAC system may be equipped with an air filter monitoring system in which a measure related to an amount of flow restriction presented by the air filter may be obtained, and a current status of the air filter may be determined based at least in part on the obtained measure related to the amount of flow restriction presented by the air filter. The measure related to an amount of flow restriction presented by the air filter may include, for example, a differential pressure across the air filter, a static pressure upstream or downstream of the air filter, a flow rate of air passing through the air filter, or any other suitable measure, as desired. The differential pressure drop across a new, clean air filter may be low, but may increase as the air filter catches dust and other particulate matter during the operation of the HVAC system. After a period of time, the differential pressure drop across the air filter may become significantly higher, and replacement of the air filter may be required to avoid potential damage to the HVAC system and/or its various components.

In some cases, the air filter monitor may include a differential pressure sensor including a first pressure port located in the return (incoming) air duct and a second pressure port located in the supply (outgoing) air duct. In some cases, the first pressure port may be located outside the return air duct and may reference the ambient or atmospheric pressure. In some cases, the air filter monitor may require a port for placing the differential pressure sensor in fluid communication with one or more regions of HVAC system. As ducts in HVAC systems in North America may be made of several different types of materials, such as, but not limited to sheet metal, sheet metal with inner insulation, sheet metal with outer insulation, duct board, wall board, etc., it is desirable to have a port which may be capable of secure attachment to a wall of a wide range of HVAC systems and materials. While the illustrative port is described in the context of HVAC systems and ventilation ducts, it is contemplated the illustrative port may be used in a variety of applications where parameter sensing is desired.

FIG. 1 is an illustrative port 10 for sensing one or more parameters. The illustrative port 10 may include a hollow stem 12 extending from a first end 16 to a second end 18. The hollow stem 12 may define a lumen 14 passing therethrough for provide a fluid passageway from the first end 16 to the second end 18 through a wall of an HVAC component such as an air duct. In some cases, a slot 20 may extend through the wall of the hollow stem 12 and extend from the second end 18 towards the first end 16. When provided, the slot 20 may terminate at any point between the first and second ends 16, 18. In some instances, the slot 20 may terminate prior to reaching head member 22. It is contemplated that the stem 12 may include more than one slot 20, if desired. For example, in some embodiments, the hollow stem 12 may include two slots 20 positioned approximately 180° from one another such that they are generally aligned. Such an arrangement may allow the second end 18 of the stem to be compressed to facilitate installation. However, it is contemplated that the stem 12 may include any number of slots 20 desired, such as, but not limited to, zero, one, two, three, four, or more. It is contemplated that in some embodiments, the hollow stem 12 may have an outer diameter at the second end 18 of approximately 0.32 inches or approximately 8 millimeters. However, the outer diameter of stem 12 may be of any size desired, such as, but not limited to 0.1 inches to 1.0 inches or more.

The first end 16 of the stem 12 may include a tubing port 28 for receiving tubing or other means (not explicitly shown) for connecting the port 10 to a sensor such as a pressure sensor. In some instances, the tubing port 28 may be tapered as shown in FIG. 1. However, it is contemplated that the tubing port 28 may have any desired shape. For example, in some instances, the tubing port may have a uniform diameter. In some embodiments, the tubing port may include barbs, ribs or other texture to help secure a tube to the tube port 28.

The port 10 may further include a head member 22 positioned between the first and second ends 16, 18, and may extending laterally from the stem 12. While the head member 22 is illustrated as having a generally circular outer shape, it is contemplated the head member 22 may have any shape desirable, such as, but not limited to oval, square, rectangular, etc. The head member 22 may have a cup or tapered shape having an inner surface 26 (shown in FIGS. 3 and 5) forming a recess and an outer surface 24. In some embodiments, the head member 22 may be oriented such that the inner surface 26 faces the second end 18 of the port 10. In some instances, the head member 22 may be formed of a flexible material and configured such that it deforms during installation. For example, in some instances, the head member 22 may be so arranged that when the port 10 is installed within a duct wall, the head member 22 may be compressed against the duct wall outer surface, providing pre-tension to the port 10. It is further contemplated that the head member 22 may provide a substantially fluid tight seal between the hollow stem 12 and the duct wall such that air is substantially prevented from leaking around the installation site. It is contemplated that in some embodiments, the head member may have an outer diameter of approximately 0.95 inches. However, the outer diameter of the head member 22 may be of any size desired, such as, but not limited to 0.1 inches to 2.0 inches or more. It is contemplated that the head member 22 may be sized to help provide a fluid tight seal at the installation site.

The port 10 may further include one or more ribs 30 extending longitudinally along the stem 12; each of the ribs having a first end 32 and a second end 34. The one or more ribs 30 may extend laterally from the hollow stem 12. The rib(s) 30 may be positioned along the stem 12 between the head member 22 and the second end 18. It is contemplated the port 10 may include any number of rib(s) 30 as desired, such as, but not limited to one, two, three, four, or more. In some embodiments, the port 10 may include four ribs 30. In some instances, two ribs 30 (a first pair) may be positioned on a first side of the stem 12 and two ribs 30 (a second pair) may be positioned on a second, laterally opposite, side of the stem 12. In some instances, the pairs of ribs 30 may be separated by latch members 36. As can be seen more clearly in FIG. 5, the rib(s) 30 may have a first height 48 at the first end 32 and a second height 50 at the second end 34. For clarity, the height is defined from the central axis of the hollow stem 12. In some instances, the first height 48 may be less than the second height 50 such that the height 50 of the rib(s) 30 near the head member 22 is greater than the height 48 of the rib(s) 30 closest to the second end 18 of the stem 12. It is contemplated that the rib(s) 30 may have a gradual change in height (or taper) from the first end 32 to the second end 34. When so provided, the rib(s) 30 may help guide the port 10 into a hole in the duct wall while centering the port 10 within the hole. However, in some embodiments, the rib(s) 30 may have other shapes such as a constant height, if desired. It is further contemplated that in some instances, the rib(s) 30 may be formed of a material configured to be crushable. In this instance, the rib(s) 30 may have an outer diameter (or collective outer diameter) slightly larger than a diameter of a hole in, for example, a duct wall, such that during installation, the rib(s) 30 are deformed. This may help secure the port 10 to the duct wall.

In some instances, the port 10 may include one or more flexible latch members 36. In some instances, the latch member(s) 36 may be secured to the hollow stem 12 at a first end 38. The second end 40 of the latch member(s) 36 may, in some cases, be generally free such that the latch member(s) 36 may flex and/or bend at the second end 40 thereof. In other cases, the second end 40 may be flexibly attached to the hollow stem 12 such that the latch member(s) 36 may flex and/or bend at the second end 40 thereof.

Figure 3:
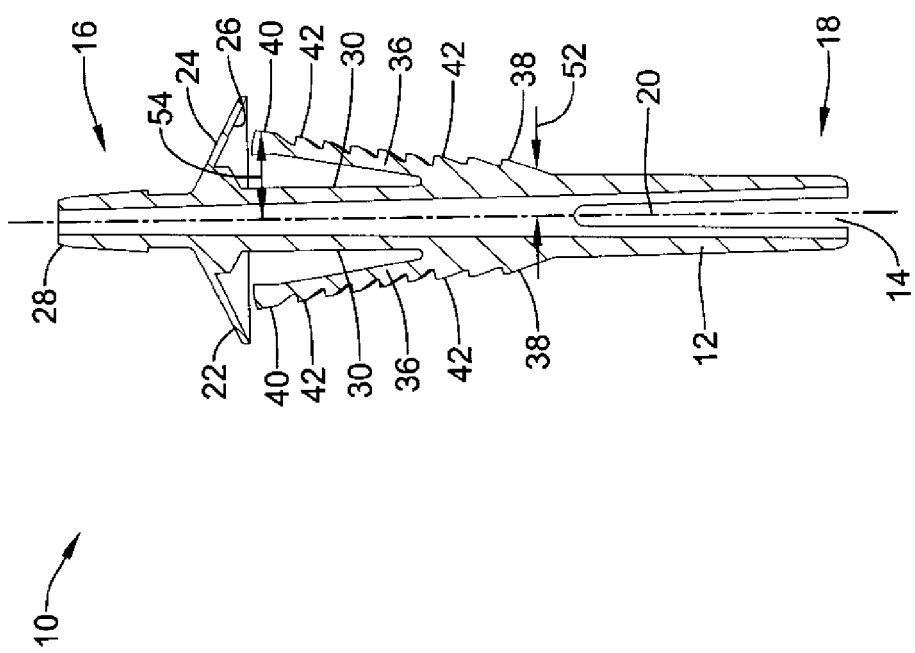
FIG. 3 is a cross-section of an illustrative duct port taken at line 3-3 of FIG. 2.

As can be seen more clearly in FIG. 3, the latch member(s) 36 may have a first height 52 at the first end 38 and a second height 54 at the second end 40. For clarity, the height is defined from the central axis of the hollow stem 12. In some instances, the first height 52 may be less than the second height 54 such that the height 54 of the latch member(s) 36 near the head 22 is greater than the height 52 of the latch member(s) 36 closest to the second end 18 of the stem 12. It is contemplated that the latch member(s) 36 may have a gradual change in height (or taper) from the first end 38 to the second end 40. However, in some embodiments, the latch member(s) 36 may have other shapes such as a constant height. It is further contemplated that the latch member(s) 36 may have a region with a slight taper (such as at the first end 38) and a region having a constant diameter (such as at the second end 40) where the second height 54 is greater than the first height 52. In some instances, the latch member(s) 36 may include one or more teeth, serrations, or small ribs 42 (for clarity, not all of the illustrated teeth have been numbered in the Figures) on a surface facing away from the hollow stem 12. It is contemplated that the one or more teeth 42 may provide interference with a hole in the duct. The port 10 may include any number of latch member(s) 36 as desired, such as, but not limited to one, two, three, four, or more.

In some embodiments, the port 10 may include two latch member(s) 36. In some instances, one latch member 36 may be positioned on a first side of the stem 12 and one latch member 36 positioned on a second, laterally opposite, side of the stem 12. In some instances, the latch member(s) may be separated by ribs 30. The latch member(s) may have an outer diameter (or collective outer diameter) at the second end 40 slightly larger than a hole in a duct, however, this is not required. In some instances, the flexible latch member(s) 36 may deform inwards (towards the hollow stem 12) during installation to allow the second end 18 of the hollow stem 12 to pass through the duct wall and into the duct. Once the port 10 has been installed within a hole in a duct wall, the latch member(s) 36 may return toward their original orientation, providing a locking mechanism for the port 10 and helping to prevent withdrawal of the port 10 from the duct wall.

Figure 2:
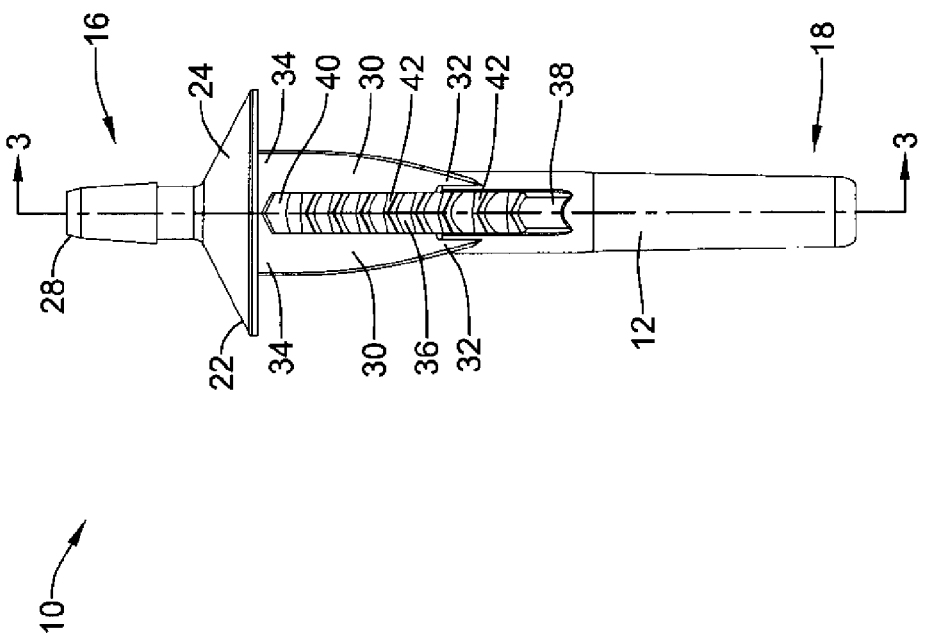
FIG. 2 is a side view of an illustrative duct port.

FIG. 2 illustrates a side view of the illustrative port 10. As can be seen, one or more ribs 30 may be positioned on opposite sides of the hollow stem 12. For example, one or more rib(s) 30 may be positioned extending from a first side of the hollow stem 12, while one or more rib(s) 30 may extend from a second side of the hollow stem 12. In the illustrative embodiment, the ribs 30 may be separated by a flexible latch member 36 extending along a third side of the stem 12. While not explicitly shown, it is contemplated that the ribs 30 may be further separated by one or more additional latch member(s) 36 extending along a fourth side of the stem 12 opposite the third side. As can be seen, the head member 22 may extend laterally away from a central axis of the stem 12, and in some cases, may form a cup shape that faces toward the second end 18 of the stem 12.

FIG. 3 illustrates a cross-sectional view of the illustrative port 10 taken at line 3-3 of FIG. 2. As previously discussed, and in one illustrative embodiment, the port 10 may include two flexible latch members 36 positioned on opposite sides of the hollow stem 12. A first end 38 of the latch members 36 may be secured to the hollow stem 12. It is contemplated that in some embodiments, the latch members 36 may be formed as a unitary structure with the hollow stem 12. In other instances, the latch members 36 may be separately formed and attached to the hollow stem 12 using any method desired, such as, but not limited to adhesive bonding, welding, soldering, brazing, etc. In the illustrative embodiment, a second end 40 of the latch members 36 is generally free from attachment to the stem 12 such that the latch members 36 may flex or temporarily deform. In some instances, the latch member(s) 36 may have a first height 52 at the first end 38 and a second height 54 at the second end 40. The first height 52 may be less than the second height 54 such that the height 54 of the latch member(s) 36 near the head 22 is greater than the height 52 of the latch member(s) 36 closest to the second end 18 of the stem 12. It is contemplated that the latch member(s) 36 may have a gradual change in height (or taper) from the first end 38 toward the second end 40. However, in some embodiments, the latch member(s) 36 may have other shapes such as a constant height. It is further contemplated that the latch member(s) 36 may have a region with a slight taper (such as at the first end 38) and a region having a constant diameter (such as at the second end 40) where the second height 54 is greater than the first height 52.

A cup shape of the head member 22 may be more clearly visualized in FIG. 3. As can be seen, the head member 22 may be angled or tilted towards the second end 18 of the hollow stem 12 such that the inner surface 26 of the head member 22 may form a recess or cup shape. The recess may help the head member 22 to more easily flex or deform during installation of the port 10, and in some cases, help form a seal.

Figure 4:
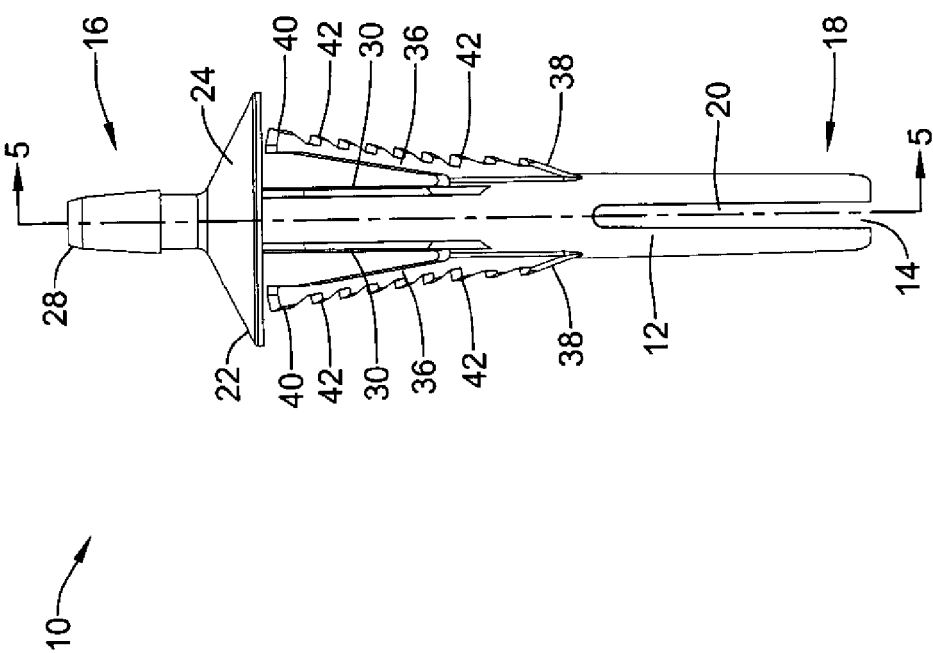
FIG. 4 is another side view of an illustrative duct port.

FIG. 4 is another side view of the illustrative port 10. As can be seen, one or more latch members 36 may be positioned on opposite sides of the hollow stem 12. For example, a first latch member 36 may be positioned extending from a first side of the hollow stem 12, while a second latch member 36 may extend from a second side of the hollow stem 12. In some cases, the latch members 36 may be separated by one or more rib(s) extending along a third side of the stem 12. While the port 10 is illustrated as including two ribs 30 on a side of the stem 12, it is contemplated the port 10 may include any number of ribs as desired. While not explicitly shown, it is contemplated that the latch members 36 may be further separated by one or more additional ribs 30 extending along a fourth side of the stem 12 opposite the third side.

In some instances, the latch members 36 may include one or more teeth 42 positioned along at least part of the length of the latch members 36. The teeth 36 may be small protrusions or serrations extending from the latch members 36. It is contemplated that the teeth 42 may provide interference with the hole in the duct wall, thus utilizing friction to help secure the port 10 within the hole. While the latch members 36 are illustrated as including teeth 42 along the entire length of the latch members 36, it is contemplated the latch members 36 may include teeth 42 along only a portion thereof. For example, in some instances, the teeth 42 may extend along a region adjacent the second end 40. In other instances, the teeth 42 may extend along a region adjacent the first end 38. It is further contemplated the teeth 42 may be positioned in an intermediate region between the first and second ends 38, 40, or any combination of regions.

Figure 5:
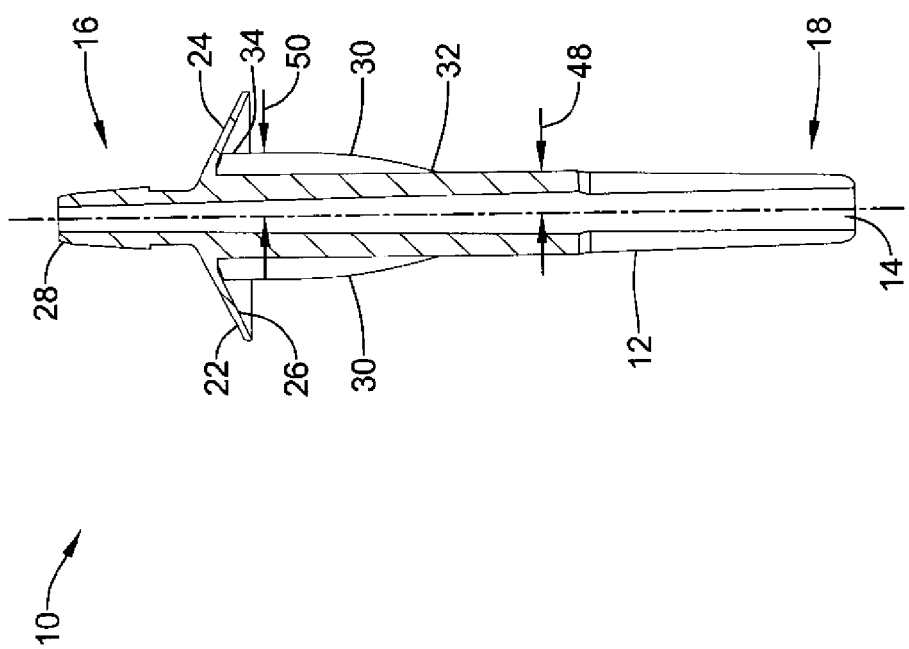
FIG. 5 is a cross-section of an illustrative duct port taken at line 5-5 of FIG. 4.

FIG. 5 illustrates a cross-sectional view of the illustrative port 10 taken at line 5-5 of FIG. 4. As previously discussed, and in one illustrative embodiment, the port 10 may include four ribs 30 with two positioned on opposite sides of the hollow stem 12. It is contemplated that in some embodiments, the ribs 30 may be formed as a unitary structure with the hollow stem 12. In other instances, the ribs 30 may be separately formed and attached to the hollow stem 12 using any method desired, such as, but not limited to adhesive bonding, welding, soldering, brazing, etc.

In some instances, the ribs 30 may have a first height 48 at the first end 32 and a second height 50 at the second end 34. In some instances, the first height 48 may be less than the second height 50 such that the height 50 of the ribs 30 near the head member 22 is greater than the height 48 of the ribs 30 closest to the second end 18 of the stem 12. It is contemplated that the ribs 30 may have a gradual change in height (or taper) from the first end 32 to the second end 34. When so provided, the ribs 30 may help guide the port 10 into a hole in a duct or other HVAC component while centering the port 10 within the hole. However, in some embodiments, the ribs 30 may have other shapes such as a constant height. In some embodiments, the ribs 30 may extend to the inner surface 26 of the head member 22, however this is not required. It is contemplated that the ribs 30 may terminate at any point between the first end 32 of the ribs 30 and head member 22 desired.

Figure 6:
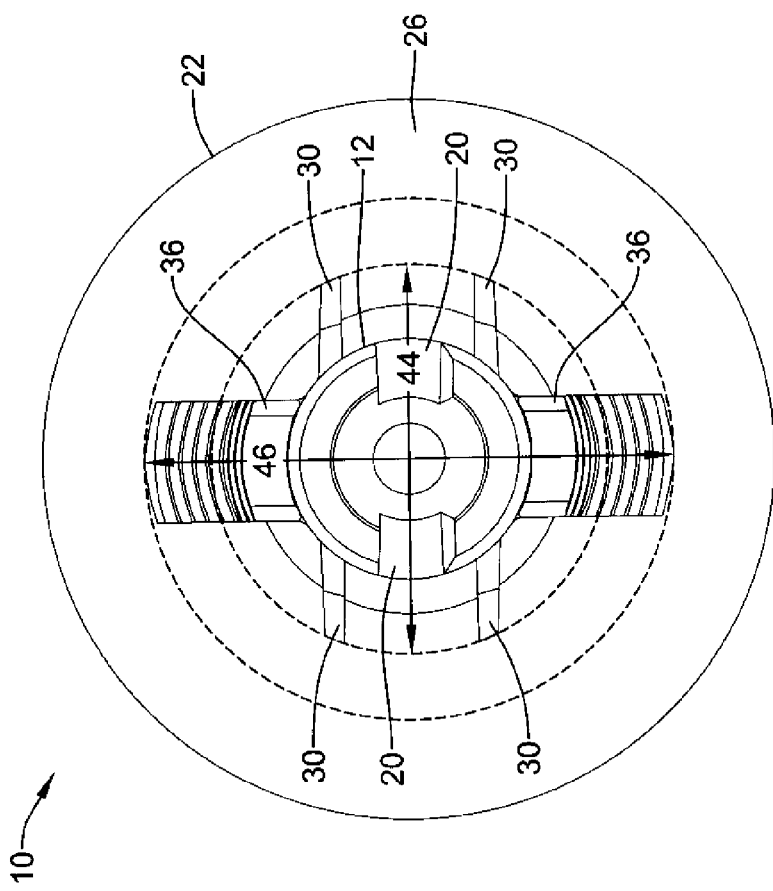
FIG. 6 is an end view of an illustrative duct port.

FIG. 6 illustrates an end view of the illustrative port 10, taken from the second end 18 of the stem 12. The illustrative port 10 may include four ribs 30 positioned on two sides of the stem 12. In some instances, the port may include two ribs 30 positioned on a first side, and two ribs 30 positioned on a second side of the stem 12. It is contemplated that the ribs 30 may be positioned directly across from one another as shown, but this is not required. In some embodiments, the ribs 30 may be staggered from one another. The two pairs of ribs 30 may be separated by two flexible latch members 36 positioned on a third and a fourth side of the stem 12. In the illustrative embodiment, the ribs 30 and latch members 36 may together form an anchor member configured to secure the port 10 to the wall of a HVAC component such as a duct. However, it is contemplated that in some embodiments, either the ribs 30 or the latch members 36 may alone form an anchor member, as desired.

The second ends 34 of the ribs may collectively form an outer diameter 44 illustrated in dashed lines. Similarly, the second ends 40 of the latch members 36 may collectively form an outer diameter 46 illustrated in dashed lines. In some instances, the outer diameter 44 of the ribs 30 may be smaller than the outer diameter 46 of the latch members 36. In other instances, the outer diameter 46 of the latch members 36 may be smaller than the outer diameter 44 of the ribs 30.

As discussed above, the illustrative port 10 may be suitable for installation in a variety of HVAC components, such as a variety of ventilation ducts. Methods of installation the illustrative port 10 in a few illustrative ventilation ducts will now be described. As previously discussed, some ventilation ducts may be formed of sheet metal. In some cases, the sheet metal may range from approximately 18 gauge thickness to 26 gauge thickness (or approximately 0.05 inches to 0.0187 inches). A hole may be drilled through the wall of the duct. The diameter of the hole may be chosen based on the size of the port 10. In some instances, a 0.5 inch hole may be drilled through the wall of the duct. The port 10 may be pushed through the hole until the head member 22 engages an outer wall surface of the duct, such that the first end 16 is disposed outside of the duct and the second end 18 is disposed within the interior of the duct. As discussed above, the head member 22 may be sized such that the head member 22 is larger than the hole through the duct wall. As the port 10 is pushed through the hole, the head member 22 may flex against an outer surface of the duct wall such that the head member 22 is pushed (at least in part) towards the first end 16 of the hollow stem 12. This may provide pre-tension to the port 10. As the port 10 is being pushed through the hole, the surrounding ribs 30 may center the port 10 within the hole. It is further contemplated that, in some cases, the ribs 30 may be crushed, or partially crushed, during installation of the port 10, but this is not required. Furthermore, as the port 10 is being pushed through the hole, the flexible latch members 36 may be flexed towards the hollow stem 12. Once the second ends 40 of the latch members 36 are through the hole, the latch members 36 may return toward their original shape. As discussed above, the second ends 40 of the latch members 36 may form a collective outer diameter larger than the diameter of the hole through the duct wall. Thus, once the second ends 40 of the latch members 36 have been forced through the hole in the duct wall, the second ends 40 extend outwards (away from the stem 12) to effectively lock the port in place. It is further contemplated that the distance between the second ends 40 of the latch members 36 and the head member may be less than the thickness of the duct wall such that the head member 22 is deformed during installation and forced against the duct wall to help form a fluid tight seal with the wall.

In some embodiments, the ventilation ducts may be formed of sheet metal with inner insulation. In some instances, the insulation may be up to 2 inches thick. The installation of the illustrative port 10 into such a duct configuration may include the basic steps discussed above with respect to sheet metal ducts with the following additional steps. In some instances, when drilling the hole through the sheet metal duct, a hole of the same diameter may also be drilled through the insulation. In other instances, after a hole is drilled through the sheet metal portion of the duct, a smaller hole, approximately the size of the second end 18 of the hollow stem 12, may be drilled through the insulation. Once a hole has been formed in through the sheet metal and the insulation, the port 10 may be installed in the same manner as the sheet metal only duct.

In some embodiments, the ventilation ducts may be formed of sheet metal with outer insulation. In some instances, the insulation may be up to 2 inches thick. The installation of the illustrative port 10 into such a duct configuration may include the basic steps discussed with respect to sheet metal ducts with the following additional steps. Prior to forming a hole in the sheet metal duct, an installer may remove a region of the outer insulation. The area of insulation to be removed may be larger than the diameter of the head member 22 to allow the head member to contact the duct wall once the port 10 has been installed. After the appropriate amount of insulation has been removed, a hole may be drilled through the sheet metal duct wall and the port 10 may be installed in the same manner as the sheet metal only duct.

In some embodiments, the ventilation ducts may be formed of duct board comprising mineral fibers (such as, but not limited to, fiberglass). When so provided, a hole may be formed though the duct wall just large enough for the second end 18 of the stem 12 to pass through. Once the hole has been formed, the port 10 may be installed in the same manner as the sheet metal only duct. As the hole formed in the duct wall is not larger than the hollow stem, the port 10 may be secured by both frictional forces and the flexible latch members 36.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A port for providing a fluid passageway through a wall of a Heating, Ventilation, and/or Air Conditioning (HVAC) component, comprising:
   a hollow stem member having a first end and a second end;
   a flexible head member extending laterally away from the hollow stem member, the flexible head member having an outer surface and an inner surface defining a wall that is structured to flex toward the first end of the hollow stem member and to form a substantially fluid tight seal with the wall of the HVAC component when urged against the wall of the HVAC component during installation of the port;
   two or more ribs extending longitudinally along the hollow stem member, the two or more ribs situated between the flexible head member and the second end of the hollow stem member, the two or more ribs extending laterally away from the hollow stem member by a height, wherein the height of at least part of the two or more ribs increases in the direction of the flexible head member; and
   one or more flexible latch members extending longitudinally along the hollow stem member, the one or more flexible latch members situated between the flexible head member and the second end of the hollow stem member, each of the one or more flexible latch members having a first end that is secured to the hollow stem member and a second end that is generally free such that the second end of each of the one or more flexible latch members has a relaxed position and is configured to flex inward toward the hollow stem member from the relaxed position, and wherein the flexible head member is configured to be spaced from the second end of the one or more flexible latch members even when the one or more flexible latch members are in the relaxed position, each of the flexible latch members further having a plurality of teeth, each tooth of the plurality of teeth extending in a direction laterally away from the hollow stem member by a tooth height, wherein the tooth height of the plurality of teeth increases in the direction of the flexible head member.

2. The port of claim 1, wherein, when the second end of the hollow stem member is inserted into a hole in a wall of a HVAC component:
   the two or more ribs are configured to crush;
   the flexible head member is configured to form a fluid tight seal with the wall of the HVAC component when the second end of the hollow stem member is pushed sufficiently far into the hole; and
   said plurality of teeth of the one or more flexible latch members are configured to engage the wall and secure the port to the wall of the HVAC component leaving the flexible head member in a deformed state.

3. The port of claim 1, wherein the flexible head member is cup shaped and defines an interior space that faces toward the second end of the hollow stem member.

4. The port of claim 1, further comprising a tubing port at the first end of the hollow stem member, wherein the tubing port has an outer wall that defines an enlarged diameter portion and a reduced diameter portion, wherein the enlarged diameter portion is closer to the first end of the hollow stem member than the reduced diameter portion.

5. The port of claim 1, further comprising at least one slot extending from the second end of the hollow stem member along at least part of the length of the hollow stem member but terminating before the flexible head member.

6. The port of claim 1, wherein the two or more ribs are crushable when the second end of the hollow stem member is inserted into a hole in the wall of the HVAC component.

7. The port of claim 1 wherein the one or more flexible latch members comprise two or more flexible latch members.

8. The port of claim 7, wherein at least one of the two or more ribs are situated between the two or more flexible latch members.

9. The port of claim 7, wherein the two or more ribs define a maximum outer diameter and the two or more flexible latch members define a maximum outer diameter, wherein the maximum outer diameter of the two or more ribs is larger than the maximum outer diameter defined by the two or more flexible latch members along at least part of hollow stem member.

10. The port of claim 7, wherein the two or more ribs define an outer diameter and the two or more flexible latch members define an outer diameter, wherein the outer diameter of the two or more ribs is smaller than the outer diameter defined by the two or more flexible latch members along at least part of hollow stem member.

11. The port of claim 7, wherein the two or more flexible latch members include a first flexible latch member and a second flexible latch member, with the first flexible latch member and the second flexible latch member positioned on opposing lateral sides of the hollow stem member.

12. The port of claim 11, wherein the two or more ribs include a first rib positioned between the first flexible latch member and the second flexible latch member on a first side of the hollow stem member, and a second rib positioned between the second flexible latch member and the first flexible latch member on a second opposite side of the hollow stem member.

13. The port of claim 11, wherein the two or more ribs include a first rib and a second rib positioned between the first flexible latch member and the second flexible latch member on a first side of the hollow stem member, and a third rib and a fourth rib positioned between the second flexible latch member and the first flexible latch member on a second opposite side of the hollow stem member.

14. A port for providing a fluid passageway through a wall of a Heating, Ventilation, and/or Air Conditioning (HVAC) component, comprising:
   a hollow stem member having a first end and a second end;
   a flexible head member extending laterally away from the hollow stem member and structured to flex toward the first end of the hollow stem member and to form a substantially fluid tight seal with the wall of the HVAC component when urged against the wall of the HVAC component during installation of the port, the flexible head member positioned between and spaced a first distance from the first end and spaced a second distance from the second end of the hollow stem member;
   one or more flexible latch members extending longitudinally along the hollow stem member, the one or more flexible latch members situated between the flexible head member and the second end of the hollow stem member, the one or more flexible latch members having a first end that is secured to the hollow stem member and a second end that is generally free such that the second end of each of the one or more flexible latch members has a relaxed position and is configured to flex inward toward the hollow stem member from the relaxed position, and wherein the flexible head member is configured to be spaced from the second end of the one or more flexible latch members even when the one or more flexible latch members are in the relaxed position; and two or more ribs extending longitudinally along the hollow stem member, the two or more ribs situated between the flexible head member and the second end of the hollow stem member, the two or more ribs extending laterally away from the hollow stem member by a height, wherein the height of the two or more ribs increases towards the flexible head member.

15. The port of claim 14, wherein the flexible head member is cup shaped, with an interior of the cup shaped flexible head member facing toward the second end of the hollow stem member.

16. A port for providing a fluid passageway through a wall of a Heating, Ventilation, and/or Air Conditioning (HVAC) component, comprising:
   a hollow stem member having a first end and a second end; and
   a flexible head member extending laterally away from the hollow stem member and structured to flex toward the first end of the hollow stem member and to form a substantially fluid tight seal with the wall of the HVAC component when urged against the wall of the HVAC component during installation of the port, the flexible head member positioned between and spaced a first distance from the first end and spaced a second distance from the second end of the hollow stem member;
   a tubing port positioned between the first end of the hollow stem member and the flexible head member, wherein the tubing port has an outer wall that defines an enlarged diameter portion and a reduced diameter portion, wherein the enlarged diameter portion is closer to the first end of the hollow stem member than the reduced diameter portion;
   one or more flexible latch members extending longitudinally along the hollow stem member, the one or more flexible latch members situated between the flexible head member and the second end of the hollow stem member, each of the one or more flexible latch members having a first end that is secured to the hollow stem member and a second end that is generally free, with one or more teeth on an edge of the one or more flexible latch members facing away from the hollow stem member; and
   two or more ribs extending longitudinally along the hollow stem member, the two or more ribs situated between the flexible head member and the second end of the hollow stem member, the two or more ribs extending laterally away from the hollow stem member by a height, wherein the height of the two or more ribs increases towards the flexible head member.

17. The port of claim 16, wherein the flexible head member is cup shaped defining an interior space that faces toward the second end of the hollow stem member.

18. A port for providing a fluid passageway through a wall of a Heating, Ventilation, and/or Air Conditioning (HVAC) component, comprising:
   a hollow stem member having a first end and a second end;
   a flexible head member extending laterally away from the hollow stem member, the flexible head member positioned between the first end and the second end of the hollow stem member, the flexible head member having an outer surface and an inner surface defining a wall that is configured to flex, the wall extending away from the hollow stem member at an angle to define an opening between the wall and the hollow stem member that faces toward the second end of the hollow stem member;
   an anchor member for anchoring the hollow stem member to the wall of the HVAC component when the second end of the hollow stem member is passed sufficiently far through a hole in the wall, the anchor member configured to anchor the hollow stem member to the wall such that the flexible head member is flexed and compressed by the wall in a direction toward the first end of the hollow stem member such that the flexible head member provides a fluid seal between the hollow stem member and the wall; and
   two or more ribs extending longitudinally along the hollow stem member, the two or more ribs situated between the flexible head member and the second end of the hollow stem member, the two or more ribs extending laterally away from the hollow stem member by a height, wherein the height of the two or more ribs increases towards the flexible head member.

\* \* \* \* \*